United States Patent [19]
Wells et al.

[11] Patent Number: 5,228,985
[45] Date of Patent: Jul. 20, 1993

[54] COOKING OIL FILTERING APPARATUS

[75] Inventors: John Wells, Culver City; Robert E. Lebo, Silverado; Roger Ignon, Pales Verdes Estates; Steve G. Hauser, Calabasas; Dan R. Haynes; Sandra Haynes, both of Costa Mesa; Robert L. Serber, Sherman Oaks, all of Calif.

[73] Assignee: LaRoche Filter Systems, Inc., Costa Mesa, Calif.

[21] Appl. No.: 714,926

[22] Filed: Jun. 13, 1991

[51] Int. Cl.$^5$ .................. B01D 29/17; B01D 35/14
[52] U.S. Cl. .................. 210/167; 210/184; 210/234; 210/238; 210/241; 210/335; 210/340; 210/416.1; 210/452; 210/470; 210/475; 210/499; 210/DIG. 8; 99/408
[58] Field of Search .................. 210/DIG. 8, 167, 184, 210/195.1, 234, 238, 241, 258, 295, 318, 335, 339, 340, 406, 416.1, 452, 470, 475, 477, 499; 99/408

[56] References Cited

U.S. PATENT DOCUMENTS

| | | | |
|---|---|---|---|
| 2,733,815 | 2/1956 | Kwochka | 210/DIG. 8 |
| 3,107,601 | 10/1963 | Longmire | 99/408 |
| 3,147,220 | 9/1964 | Avery | 210/DIG. 8 |
| 3,167,435 | 1/1965 | Hall | 210/DIG. 8 |
| 3,279,605 | 10/1966 | Shepherd | 99/408 |
| 3,447,685 | 6/1969 | Bircher | 210/167 |
| 3,648,595 | 3/1972 | Morris | 210/DIG. 8 |
| 3,759,388 | 9/1973 | Thomason | 210/DIG. 8 |
| 3,977,973 | 8/1976 | Anderson | 210/DIG. 8 |
| 3,984,447 | 10/1976 | Cooper | 210/167 |
| 4,019,987 | 4/1977 | Krasnow | 210/499 |
| 4,282,094 | 8/1981 | Mitchell | 210/167 |
| 4,328,097 | 5/1982 | Whaley | 210/DIG. 8 |
| 4,420,006 | 12/1983 | Moore | 99/408 |
| 4,444,095 | 4/1984 | Anetsberger | 210/DIG. 8 |
| 4,517,082 | 5/1985 | Prudhomme | 210/DIG. 8 |
| 4,591,434 | 5/1986 | Prudhomme | 210/DIG. 8 |
| 4,702,827 | 10/1987 | Wenzel | 210/DIG. 8 |
| 4,826,590 | 5/1989 | Turman | 210/DIG. 8 |
| 4,945,893 | 8/1990 | Manchester | 99/408 |
| 4,957,758 | 9/1990 | Drijftholt | 210/DIG. 8 |
| 4,959,144 | 9/1990 | Bernard | 210/DIG. 8 |

Primary Examiner—Thomas M. Lithgow
Attorney, Agent, or Firm—Brown, Martin, Haller & McClain

[57] ABSTRACT

A portable cooking oil filtering unit has an outer housing completely enclosing all the filter stages and providing access to the stages for maintenance purposes via doors and removable closures. The housing has an inlet conduit for connection to a cooking vat drain outlet, and an outlet conduit for returning filtered oil to the cooking vat. A first stage filter in the housing is connected to the inlet conduit for filtering relatively large size particles from the oil, and the filtered oil is connected to at least one additional filter stage for filtering smaller particles from the oil. A pump is connected downstream of the final filter stage, between that filter stage and the outlet conduit, for drawing oil through the filter stages under vacuum rather than pumping it through the filters under positive pressure. One of the filter stages is accessible to allow oil-life enhancing chemicals to be added to the oil.

11 Claims, 5 Drawing Sheets

COOKING OIL FILTERING APPARATUS

BACKGROUND OF THE INVENTION

The present invention relates generally to oil filtering equipment and is particularly concerned with apparatus for filtering hot cooking oil or shortening from a cooking vat.

Cooking oils used in restaurants or large kitchens of other types of institution tend to become contaminated after a time with contaminants such as small food particles and moisture. Particulate matter in the oil will ultimately make the cooked food taste bad, and the oil must therefore be cleaned or replaced periodically. Cooking oil from commercial cooking vats is typically cleaned by filtering, which is time consuming and can also be hazardous, since the oil will still be very hot while it is being filtered. Existing filtering systems are typically gravity operated, and the oil must be very hot so that its viscosity is low enough for it to flow through the filter media. Personnel may be burnt or scalded if hot oil is splashed during filtering, and any spilt oil can present a slipping hazard if not cleaned up immediately.

Even when filtered periodically, cooking oil must still be replaced relatively frequently to produce optimum results. Thus, cooking oil represents a significant expense to the food service industry. Current research findings indicate that the more expensive, all liquid vegetable oils are the most healthy oils for use in cooking, and large kitchens will probably have to switch to using such oils exclusively in the near future. Typical filtering systems in use in the food service industry often only extend the cooking oil lifetime to around 7 days, as compared to one day if unfiltered. Thus, a cooking oil filtering apparatus which could significantly extend the useful lifetime of an edible oil would considerably reduce expenses in the food service industry.

Typical cooking oil filtering units require a great deal of cleaning and maintenance, often after each filtering operation, and must often be assembled in advance of each filtering operation. Thus, the filtering procedure is lengthy and complicated.

In U.S. Pat. No. 4,826,590 of Turman a cooking oil filtering system is described in which cooking oil from a series of vats is filtered and returned sequentially to the vats via a pre-filter and a set of secondary filters which remove a larger proportion of particles from the oil, increasing the usable lifetime of the oil up to about one month. However, this system is relatively large and may not be suitable for all kitchens.

SUMMARY OF THE INVENTION

It is an object of the present invention to provide a new and improved cooking oil filtering apparatus.

According to the present invention, a cooking oil filtering apparatus is provided which comprises an outer housing having an inlet conduit for connection to a fryer drain outlet to supply cooking oil to be filtered to the unit, and an outlet conduit for returning filtered oil to the fryer, a first stage filter in the housing connected to the inlet conduit for filtering particles above a predetermined size from the oil, and at least one additional filter stage in the housing connected to the first filter stage for removing smaller particles from the oil. A pump is connected between the additional filter stage and the outlet conduit for drawing oil through the filter stages and pumping filtered oil back to the cooking vat.

Preferably, the inlet conduit has an adapter for hooking up directly to a cooking vat drain outlet. Thus, the filtering apparatus is completely sealed and enclosed during the filtering operation, avoiding the risk of personnel being splashed with hot oil and spilling of oil in the vicinity of the apparatus. The position of the pump downstream of the filters to draw or suck oil through the system under vacuum, rather than positively pumping oil under pressure through the filters, adds to the safety of the apparatus.

In a preferred embodiment of the invention there are three stages of filters, the first stage comprising a filter screen extending across at least part of a reservoir pan or tray for filtering relatively coarse particles from the oil, the second stage comprising a filter canister containing a suitable filter element for filtering finer particles from the oil, and the third stage comprising a plurality of filter canisters connected in parallel and each containing a filter cartridge for filtering very fine particles from the oil before returning it via the pump to a cooking vat. Preferably, the filter cartridges in the third stage filters comprise rolls of filter material mounted on a central imperforate dowel. The fluid must pass through the entire height of the filter material roll from the inlet to the outlet, and the wound filter material forms a tortuous path and tends to remove sub-micron size solids. The mass of filter material will also retain various contamination solubles, including moisture, through adsorption. Preferably, the filter material is a cellulosic material such as paper having controlled porosity of a micro-pore level to achieve the desired filtration level.

Preferably, the first stage reservoir pan or tray and filter screen are removably mounted in the housing, so that they can be taken out periodically for cleaning. A pick up tube extends from the reservoir pan to the inlet of the next filter stage, and this is preferably automatically raised as the tray is removed, and lowered automatically into the tray as it is replaced. The filter screen itself can be removed from the tray for washing. The screen is of a material which can withstand the high temperature of oil entering the apparatus from a fryer or vat, for example, and is of a specific micron mesh, preferably of around 80 to 100 microns, which is small enough to remove a large amount of the particles from the oil but is not so small that it interferes with rapid oil flow into the reservoir pan. This ensures pump integrity and makes the filtration process faster.

Preferably, the screen has a central, raised bridge region extending across its width with valley regions on either side of the bridge region. This reduces the risk of a large number of particles gathering together over time and causing the screen to sag down into the filtered oil in the pan. The raised bridge causes a channel or river-like flow effect, in which particles are pushed aside towards the raised bridge region in a similar manner to a river bank, so that they are less likely to cause sagging.

Preferably, the screen has a smaller pore size in its central area than around its periphery. The smaller pore size in the lowermost regions of the screen will trap smaller particles, while the larger pore size at the sides allows faster oil flow when the oil level rises. The variation in pore size together with the raised central bridge causing river-like flow with particles collecting at the sides reduces the risk of dirty oil overflowing over the sides of the screen into the pan. When a fryer drain outlet opens, a large quantity of oil flows onto the filter screen, and must be able to flow through the screen quickly enough to avoid oil backing up and overflowing into the pan without being filtered. This design achieves this objective, and also allows oil to drain quickly into the pan to avoid the risk of damage to the vacuum pump or motor.

The outlet conduit for returning clean oil to a fryer or vat preferably has a handle for gripping by an operator. An on-off valve of the so-called "deadman handle" type for automatically turning off the oil flow if the operator releases their grip may optionally be provided on the handle. This ensures that oil cannot be accidentally emitted before the operator has directed the outlet end of the conduit into the vat.

This filter apparatus provides very efficient, fast and economical cooking oil filtering in a small, portable and completely enclosed unit for manual operation. The three stages of filters remove a substantial proportion of the contaminants from dirty oil, extending its useful lifetime for up to three or four weeks, and significantly reducing kitchen operating expense.

BRIEF DESCRIPTION OF THE DRAWINGS

The present invention will be better understood from the following detailed description of a preferred embodiment, taken in conjunction with the accompanying drawings, in which like reference numerals refer to like parts, and in which.

DETAILED DESCRIPTION OF THE PREFERRED EMBODIMENT

Figure 1:
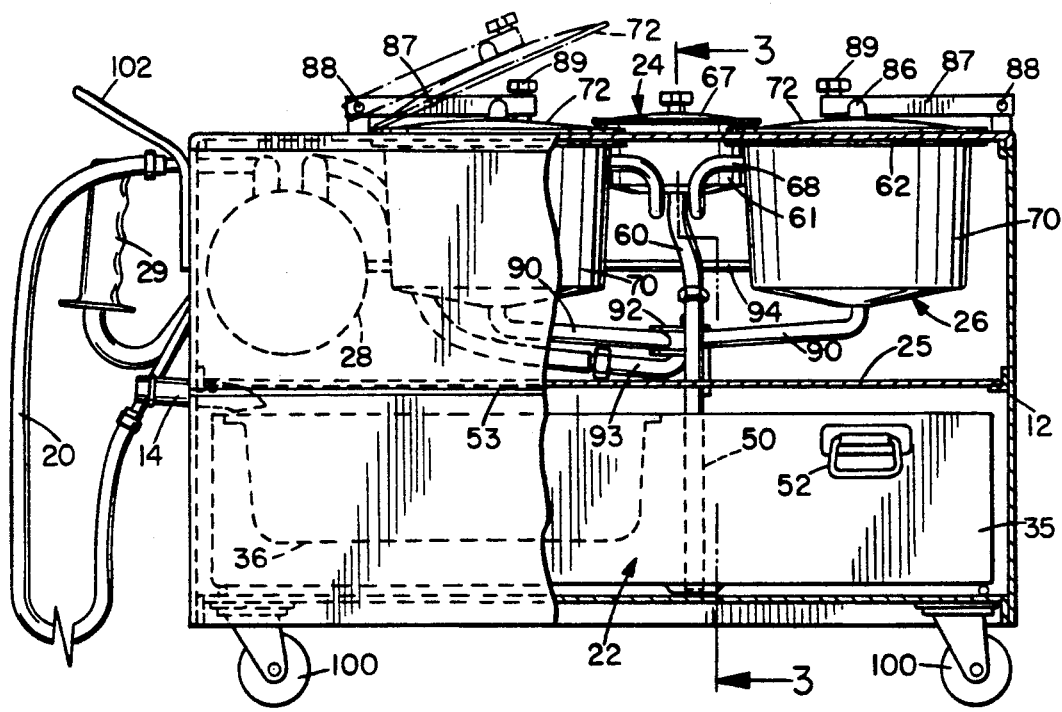
FIG. 1 is a side elevational view, partly in section, of a cooking oil filtering unit according to a preferred embodiment of the present invention.
Figure 8:
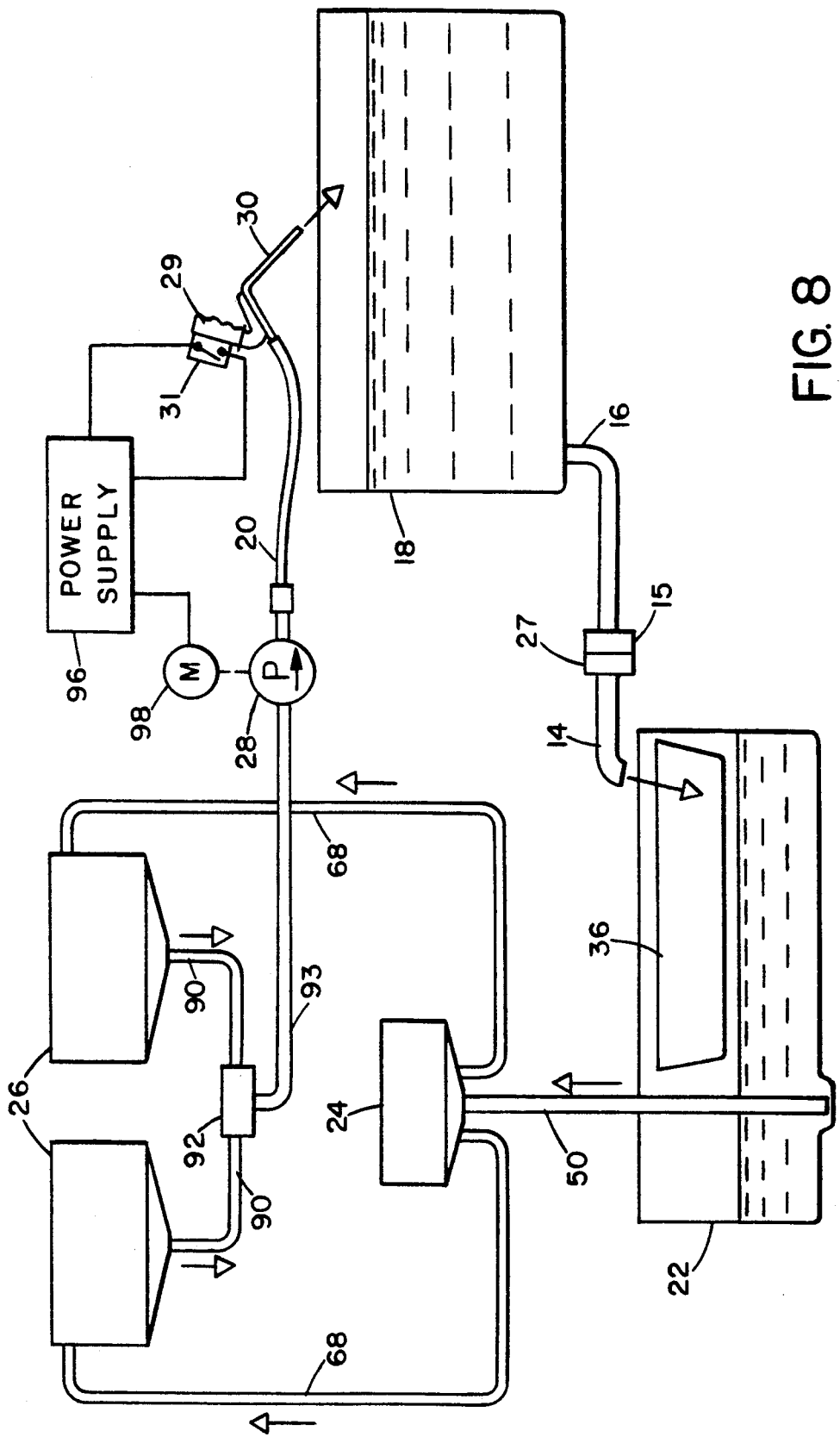
FIG. 8 is a block diagram illustrating the apparatus in use connected to a cooking oil vat.

The drawings illustrate a portable cooking oil filtering apparatus or unit 10 according to a preferred embodiment of the present invention. FIG. 8 is a schematic block diagram of the apparatus 10 connected to a cooking oil fryer or vat 18. As best illustrated in FIGS. 1 and 8, the apparatus basically comprises an outer housing 12 having an inlet conduit or tube 14 for connection to the drain outlet 16 of a fryer or vat 18 and an outlet conduit or tube 20 for returning filtered oil to the fryer, and a series of three filter stages 22, 24, 26 mounted within the housing for filtering progressively smaller size particles from the oil. A pump 28 downstream of the filter stages is connected between the third filter stage 26 and the outlet conduit 20, with its suction side connected to the filter stage outlet to suck oil through the system under negative pressure. The flow path of oil through the apparatus is best illustrated in FIG. 8.

Figure 2:
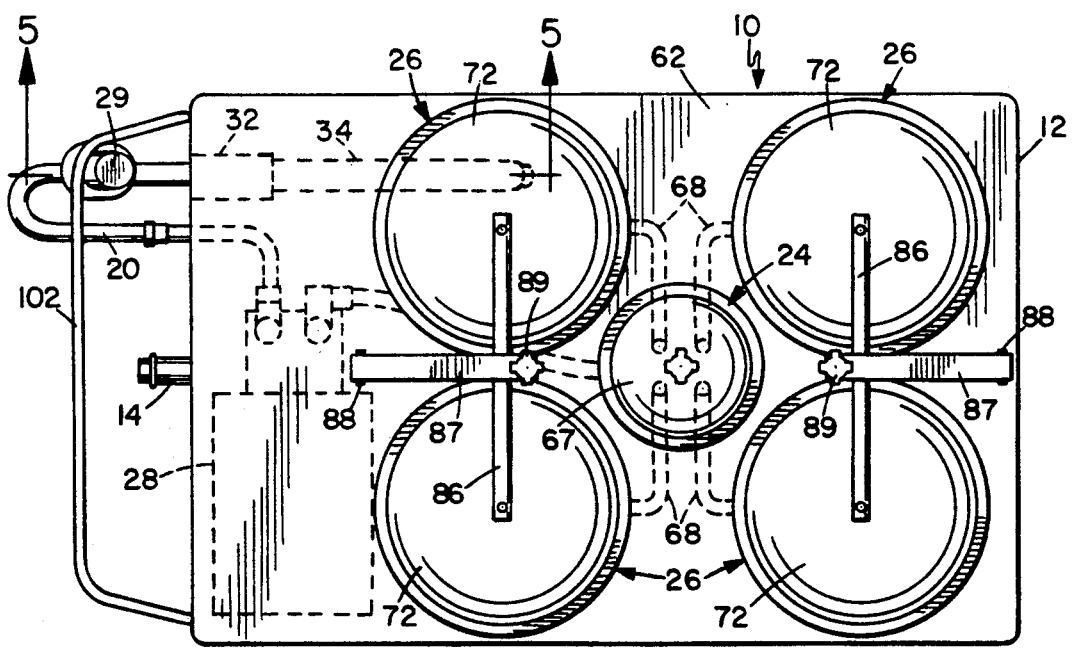
FIG. 2 is a top plan view of the unit.
Figure 5:
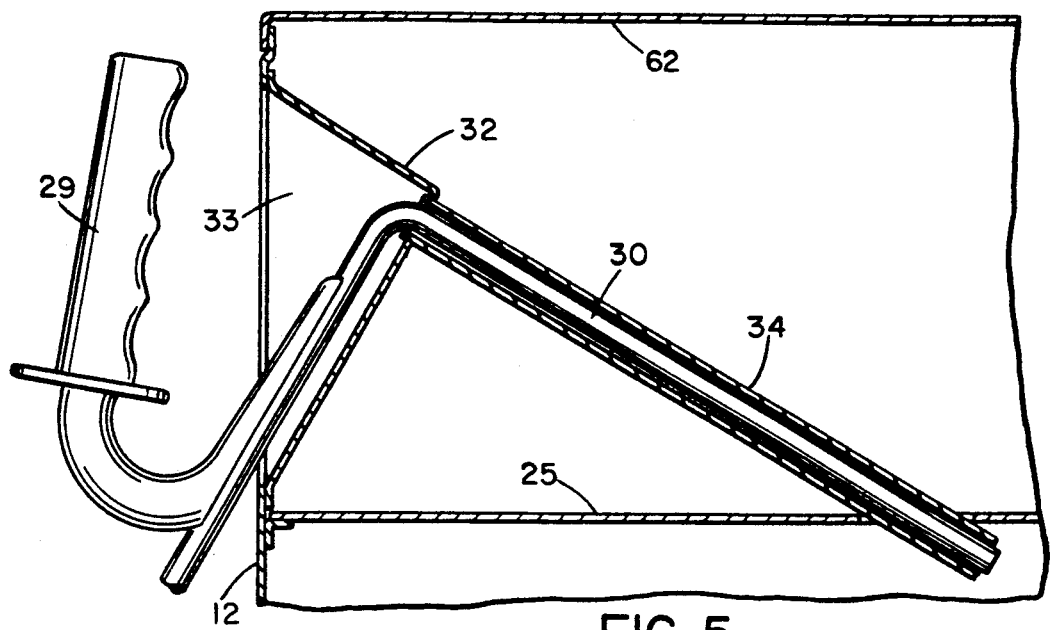
FIG. 5 is an enlarged section on the lines 5—5 of FIG. 2.

An adapter 27 is mounted at the end of inlet tube 14 for releasably securing the tube to a mating fitting of adapter 15 which is secured on the drain outlet 16 to provide a closed path for hot oil from the vat to the filter housing (see FIG. 8). Preferably, adapter 15 is provided in several thread sizes to fit onto any standard cooking vat or fryer drain outlet without interfering with operation of the fryer doors, so that a closed path for oil into the unit can be provided from any fryer. A handle 29 is mounted at the end of outlet tube 20 for gripping by a user in directing filtered oil through the outlet end or wand 30 back into the vat, and a so-called "dead-man's switch" or on-off valve 31 is optionally provided on handle 29 so that the flow of oil out of tube 20 is automatically cut off if the operator releases their grip on the handle, as best illustrated in FIG. 8. When not in use, the outlet wand is stored in a holder 32 provided for that purpose on the end wall of the housing, as best illustrated in FIGS. 2 and 5. The holder 32 comprises a recessed area 33 on the end wall with a wand storage tube 34 extending at an angle from the recess for receiving the wand, as best illustrated in FIG. 5. Preferably, the inlet and outlet conduits are both high temperature silicon hoses which have the necessary strength and resilience, and which will not impart any impurities into the high temperature oil flowing through them.

Figure 3:
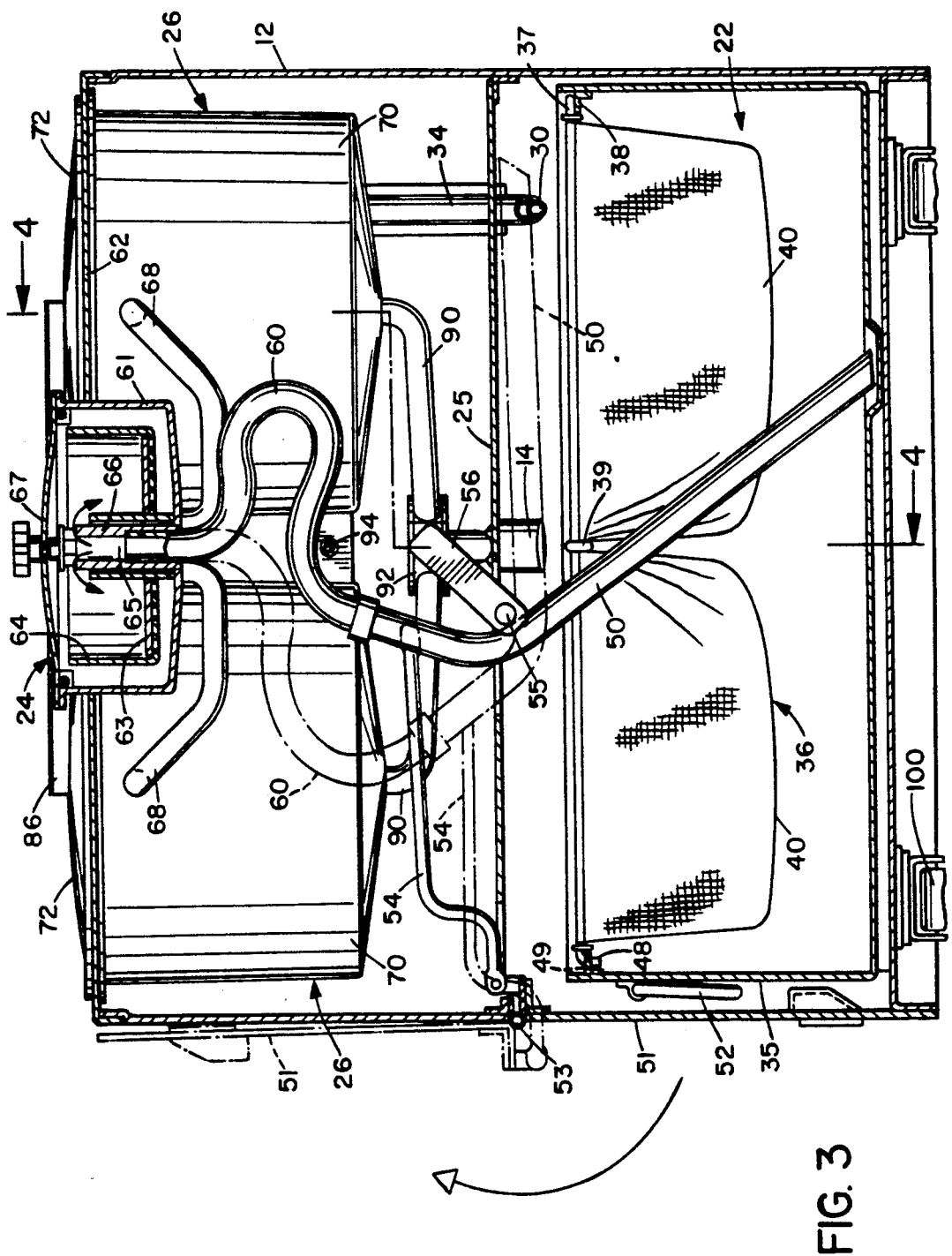
FIG. 3 is a section on the lines 3—3 of FIG. 1, on an enlarged scale.

The various filter stages will now be described in more detail. The first filter stage 22 is best illustrated in FIGS. 1, 3, 4 and 6 and comprises an oil tray or reservoir 35 mounted in the bottom of housing and having a filter screen 36 supported across part of its open upper end. A dividing wall 25 separates the lower part of the housing in which tray 35 is mounted from the upper part containing the other filter stages and pump, to shield the other parts from vapors or oil splashes rising from the tray. The filter screen 36 is mounted on a surrounding frame 37 which seats on a peripheral rim or lip 38 on tray 30, as best illustrated in FIG. 3. The screen is gathered along a strip 39 across its center to form a central bridge area with valleys or depressions 40 on each side. The screen material is capable of withstanding the high temperature of the incoming oil without deteriorating, and may be of high temperature polyethylene phthalate screening material, for example. Preferably, the screen is of smaller micron size over its central area covering side valleys 40 than around its periphery, for example 80 microns at its center and 100 microns around the periphery or raised sides of the screen.

Figure 6:
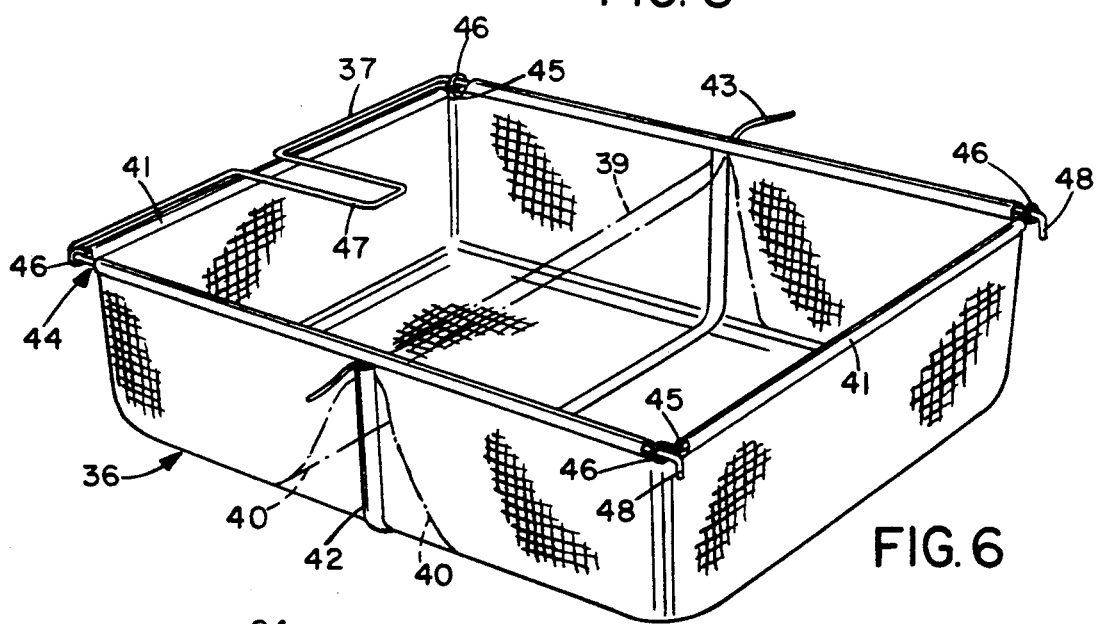
FIG. 6 is a perspective view of the filter screen.

The screen 36 and surrounding frame 37 are best illustrated in FIG. 6. As can be seen in FIG. 6, screen 36 has pockets 41 extending along its side and end edges as well as a central bridge pocket 42 extending across its center. A drawstring 43 extends through bridge pocket 42. Frame 37 has a U-shaped part 44 with legs extending through two side pockets of the screen, and end rods 45 extending through the pockets at each end of the screen and secured via eyelets 46 to the U-shaped frame. U-shaped frame 44 has a handle portion 47 for lifting the frame and screen out of the tray, and hook portions 48 at the end of each leg for engaging in corresponding openings 49 in the tray lip 38, as illustrated in FIG. 3. Drawstring 43 is pulled to gather and draw up the central bridge portion or strip 39 of the screen, as indicated in dotted outline in FIG. 6. This screen design with varying pore size and raised central bridge reduces or eliminates the risk of dirty oil overflowing over the screen sides, and also allows oil to drain quickly to prevent potential pump or motor damage.

Figure 4:
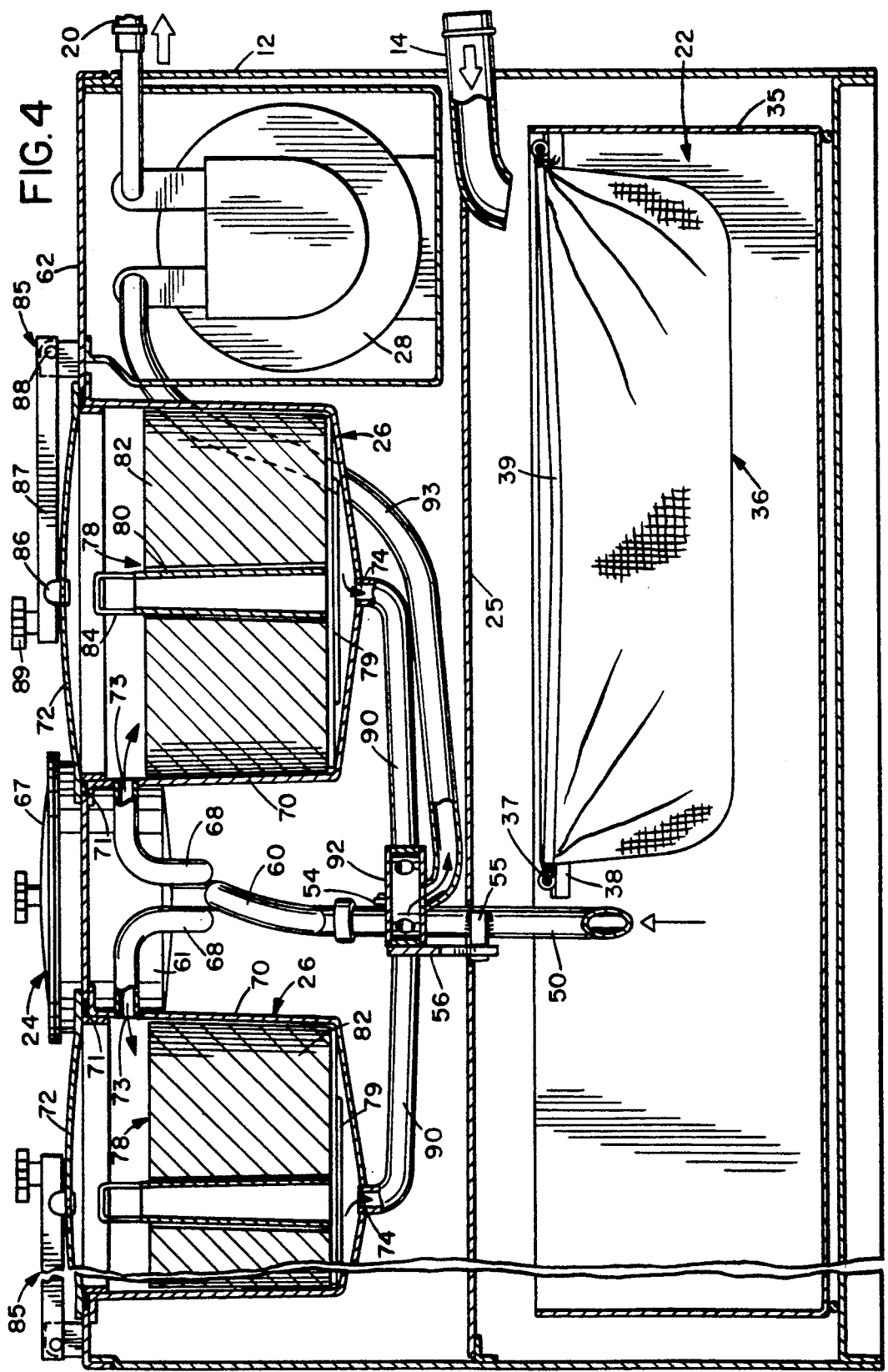
FIG. 4 is a section on the lines 4—4 of FIG. 3.

The filter screen extends across only part of the open top of the oil tray, leaving a side region open, as illustrated in FIG. 4. A pick up tube 50 for supplying oil from tray 36 to the next filter stage extends downwardly through the open side into the tray when in the lowered position illustrated in FIGS. 1 and 3.

A door 51 is provided on the front of the housing 10 for access to the interior for maintenance purposes. When the door is opened, reservoir tray 35 can be pulled completely out of the housing for cleaning and maintenance purposes via handles 52. As best illustrated in FIG. 3, pick up tube 50 is linked at one end to door hinge 53 via pivotal linkage arm 54. Tube 50 is pivoted at an intermediate point 55 in its length to a stationary arm or joint 56, so that it is constrained to pivot about this point when pulled by the linkage arm 54. With this arrangement, as the door is opened, pick up tube 50 is automatically rotated in an anti-clockwise direction about pin 55 from the solid line, lowered position illustrated in FIG. 3 into the raised position illustrated in dotted outline. This allows the tray 36 to be pulled out of the housing without interfering with the tube 50. After the tray is cleaned and replaced, it is placed back into position in the housing. The door 51 is then closed, simultaneously rotating tube 50 back down into the lowered position via linkage arm 54.

Pick up tube 50 is connected via flexible tubing 60 to the inlet end of second stage filter or chemical additive station 24, which is best illustrated in FIG. 3. Second stage filter 24 basically comprises a small filter canister 61 mounted in the top wall 62 of the housing with an internal filter member or basket 64 having a layer of filter paper 63 across its base for removing smaller size particles from the oil. This filter may also be used as an additive station for food grade chemicals such as activated carbon or charcoal, or silicates, to improve oil quality, for example. The canister 61 has an inlet 65 at its lower end which is coupled to tubing 60, and a central inlet tube 66 extending through the lower wall of the basket towards the upper end of the canister for dispensing oil into basket 64. A removable closure or lid 67 normally closes the upper end of the canister but can be removed to allow basket 64 to be lifted out for cleaning purposes and to replace the filter paper layer 63 or to add food grade, oil-life enhancing chemicals. A series of outlet tubes 68 connect the lower, outlet end of the filter canister 61 to the third filter stage 26.

Figure 7:
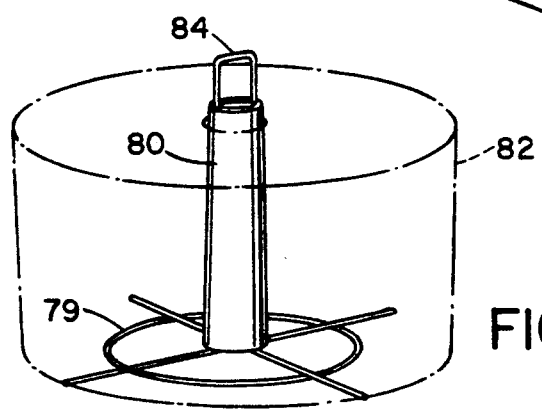
FIG. 7 is a front elevational view of part of one of the third steps filter elements.

In the preferred embodiment illustrated, the third filter stage 26 comprises four filter canisters 70 mounted in openings 71 provided in the top wall 62 of the housing, each canister having a lid 72 releasably locked on its open upper end. Two of the canisters 70 are illustrated in more detail in FIG. 4. Each canister has an inlet 73 at its upper end connected to a respective one of the outlet tubes 68 of the second filter stage, so that the canisters operate in parallel, and an outlet 74 at its lower end. A removable filter device 78 fits into canister 70. Filter device 78 is best illustrated in FIG. 7, and basically comprises a perforated base plate or open frame 79 with a central, non-perforated dowel or pin 80 projecting upwardly from its center, and a closely wound roll 82 of filter paper having a hollow central bore mounted on the central dowel 80, as best illustrated in FIG. 4. The hollow center roll 82 is wound to be coreless by initially winding it onto a collapsible, inflated dowel which is then removed. A ring 84 is provided at the upper end of each pin 80 to allow the filter device to be lifted out of the canister for replacement of the filter roll 84 as necessary. The filter paper is made with a pore size ranging from 20 microns to 0.25 microns across the paper web, and is manufactured using traditional paper-making processes and only FDA approved food grade paper manufacturing chemicals. Preferably, each filter roll 82 has a diameter of eight inches and a height of four inches, providing a large filtration surface area through which the oil must pass. This produces a so-called "depth filtration" process in which very small, sub-micron size particles are efficiently trapped.

The lids 72 are releasably locked on the open upper ends of canisters 70 via releasable locking mechanism 85, as illustrated in FIGS. 1, 2 and 4. The lids are connected together in pairs via cross bars 86, as best illustrated in FIG. 2, and each cross bar 86 is held down via a respective clamping or locking arm 87 which is pivotally mounted on support 88 at one end. The opposite end of each clamping or locking arm 87 is releasably secured to the top wall of the housing by lock nuts 89.

The outlets 76 are all connected via pipelines 90 to a central junction or manifold 92 which is in turn coupled to suction side of the pump 28 via pipeline 93. A heater comprising a caloric heating rod 94 is provided in the housing for use when the apparatus is connected with cooking vats containing digestible solid cooking fat, to ensure that the fat does not solidify while circulating through the apparatus and to loosen it prior to turning on the vacuum system. A mounting slot or opening 95 is provided in the upper wall 62 of the housing for inserting the end of outlet tube 20 when not in use. This overlies reservoir tray 30, so that any oil dripping from the end of tube 20 will be caught in tray 30.

A suitable control panel (not illustrated) is mounted on the upper wall 62 for use by the operator, and includes switches for operating the pump and the heater. Lights are also provided to indicate when the pump or heater is operating. The pump switch connects a power supply 96 to a motor 98 to activate pump 28. Preferably, the housing has wheels 100 at its base for easy movement from one cooking vat to the next, and has a handle 102 at one end for gripping by a user when moving the housing.

The filtering apparatus described above is compact, easy to use, and filters oil efficiently to increase its lifetime substantially. If solid shortening is to be filtered, the user switches on the heater before commencing the filtering operation. After allowing sufficient time for the filters to be heated (typically around 15 minutes), if the heater is used, or immediately if liquid oil is to be filtered, the housing 10 is moved into position under the fryer drain spout 16. The connector or adapter 27 is then attached to the drain spout. The fryer drain is opened to drain oil from the fryer through the filter screen 36 into the reservoir tray 35. The design of the filter screen is such that the filtered particles will not tend to gather in the lowermost regions of the screen, where the accumulated weight may potentially cause the screen to stretch and sag, but will be pushed aside in the manner of a river bank against the central bridge and outermost sides of the screen. This also allows the oil to drain quickly. The smaller pore size at the center of the screen will tend to trap the smallest particles, while oil drains more quickly through the larger size pores in the raised sides, reducing the risk of oil overflowing or damage to the vacuum pump. The largest particles of greater than around 100 micron size will be removed from the oil at this stage.

Once the fryer is empty, the return wand 30 at the end of the return tube or hose 20 is removed from its holder 32 on the top wall of the housing and directed into the fryer. At this point the pump is switched on. Oil will be pumped under vacuum from the reservoir tray 35 through the second stage filter canister 24, which removes smaller size particles from the oil, and will then be sucked through inlet tubes 68 into the third stage filter canisters. Because these canisters contain a relatively densely packed filtration medium having a height of around 4 inches, significant quantities of small size particles and contamination solubles will be removed from the oil. The total surface area of the filter medium in each canister will be of the order of 9,000 square inches, with a pore size ranging from around 20 microns down to 1 micron or less, and will trap a large proportion of the sub-micron size particles remaining in the oil before returning it to the cooking vat. The filter roll itself is biodegradable as well as completely recyclable and can be discarded and replaced when it becomes too dirty to filter the oil efficiently (typically after around 20 filtering operations).

With this system, the filters in canisters 24 only need to be changed once every seven to ten days, on average, as compared to the daily filter changing necessary in previous cooking oil filtering arrangements. The unit is self-contained and ready to use, and very easy to clean and maintain, considerably reducing manpower time required for cooking oil maintenance.

Clean oil leaving the third stage filter canisters is returned via outlet wand 30 to the cooking vat, and is directed against the sides of the vat to remove any remaining debris or particles, which are carried away with the oil back to the filtering unit via the drain outlet. When the fryer is clean, the pump is switched off. As soon as oil flow out of the outlet tube or wand stops, the wand is returned to its holder. The outlet end of wand 30 is positioned over reservoir tray 35 when inserted in the holder, so that any remaining oil will drip into the tray. The empty fryer vat can now be cleaned thoroughly. After cleaning the vat, the outlet wand is again directed into the vat and the pump is switched on. When all debris has been removed from the vat and the oil is clean, the vat drain outlet is closed and the vat is re-filled. A short time after oil flow out of the outlet wand stops, the pump is again turned off and the outlet wand is returned to its holder on the filter housing. The inlet hose is then detached from the drain outlet, and the vat is ready for use.

The filtering unit will filter oil effectively and efficiently, requiring little maintenance and extending the oil lifetime substantially. The unit is small and compact, and is completely sealed during oil pumping to reduce the risk of splashes and spills of hot oil. The reservoir pan or tray can be removed easily at the end of each day for cleaning of both the pan and the filter screen, while the filter rolls in the third stage filters can also be removed and replaced quickly and easily as necessary. The provision of three stages of filters allows more effective cleaning of the oil, extending its usable lifetime substantially and thus reducing kitchen operating expenses.

Since the pump is located downstream of the filters, so as to suck oil under vacuum pressure through the filters, the unit is much safer to operate than previous arrangements where oil was pumped under positive pressure through various filters. The risk of the filters blowing apart under pressure is eliminated with this arrangement. The vacuum pump system also has the major advantage that the oil does not have to be very hot when filtered, as was required with previous gravity filter systems where the oil temperature had to be around 360° C. for effective filtering. With this system, oil can be filtered at pilot temperatures of around 120° C., considerably increasing the safety of the filtering operation.

This filtering unit is therefore much safer both due to the position of the pump and the complete enclosure of all filter stages along with the closed loop connection with the fryer to avoid the risk of oil splashes which may burn personnel or cause slipping hazards. It is also more efficient and reliable than previous cooking oil filtering units, and is easy to repair and maintain. All of the filter stages are readily accessible for cleaning as well as any necessary parts replacement or other maintenance. The unit is completely self-contained and requires no complicated disassembly and re-assembly for cleaning purposes.

Although a preferred embodiment of the present invention has been described above by way of example only, it will be understood by those skilled in the field that modifications may be made to the disclosed embodiment without departing from the scope of the invention, which is defined by the appended claims.

We claim:

1. A cooking oil filtering apparatus, comprising:
   an outer housing having and inlet conduit for connection to a cooking vat drain outlet to supply cooking oil to the housing and an outlet conduit for returning filtered oil to a cooking vat;
   a first stage filter in the housing for receiving oil from the inlet conduit and having means for filtering particles above a predetermined size from the oil, the first stage filter having an outlet;
   at least one additional filter stage enclosed in the housing having an inlet connected to the first stage filter outlet, a filter member means for removing particles smaller than said predetermined size from the oil, and an outlet;
   a pump connected between the additional filter stage and the outlet conduit for drawing oil through the filter stages and pumping filtered oil into the outlet conduit;
   the first filter stage comprising an oil pan having an open top and said means for filtering comprising a filter screen secured across part of the open top of the oil pan, the inlet conduit being directed onto the filter screen, and the first filter stage outlet comprising a pick-up tube extending from the oil pan through the open top of the pan to one side of the filter screen; and
   the housing having an opening for access to the oil pan, and a door for normally closing the access opening, and the pick up tube being pivotally mounted in the housing for movement between a lowered position extending into the oil pan and a raised position positioned above the oil pan to allow the pan to be removed from the housing.

2. The apparatus as claimed in claim 1, including two additional filter stages between the first stage filter and the pump.

3. The apparatus as claimed in claim 2, wherein the additional filter stages comprise a second filter device connected to the first stage filter outlet, the second filter device having a plurality of outlets, and a third filter stage comprising a plurality of separate filter canisters each having an inlet connected to a respective one of the second filter device outlets and an outlet connected to said pump.

4. The apparatus as claimed in claim 3, wherein each third stage filter canister comprises an outer casing and a roll of cellulosic filter material removably mounted in the outer casing, the cellulosic filter material having a pore size about 20 microns down to about 1 micron.

5. The apparatus as claimed in claim 3, wherein the second filter device has a removable end cap for allowing oil-life enhancing chemicals to be added to the oil during filtration.

6. The apparatus as claimed in claim 1, wherein the inlet conduits has an adapter member at its inlet end for releasably coupling the inlet conduit directly to a cooking vat drain outlet.

7. The apparatus as claimed in claim 1, wherein the filter screen is removably mounted in an upper end of the oil pan, the screen having a surrounding peripheral frame with a handle for lifting the screen from the oil pan, the oil pan having a peripheral lip extending around at least part of its upper end for forming a seat for said frame.

8. The apparatus as claimed in claim 1, including a pivot arm means linking the pick up tube to the door for automatically raising the tube when the door is opened and automatically lowering the tube when the door is closed.

9. The apparatus as claimed in claim 1, wherein the filter screen includes a central, raised bridge portion extending across the width of the screen and lowered valley portions on each side of the raised bridge portion.

10. The apparatus as claimed in claim 1, wherein the outlet conduit includes a handle at its outlet end for gripping by a user, a valve at the outlet end movable between an open position and a closed position cutting off oil flow out of the outlet conduit, and switch means on the handle for operating the valve.

11. The apparatus as claimed in claim 1, wherein said additional filter stage comprises a plurality of identical filter canisters connected in parallel, the housing having an upper wall with a plurality of openings, each filter canister being mounted in a respective one of said openings, and having an open upper end and a removable lid for releasably closing said open upper end.

* * * * *